No. 665,385. Patented Jan. 1, 1901.
J. T. EDSON.
CARD CASE.
(Application filed Mar. 19, 1900.)
(No Model.) 2 Sheets—Sheet 1.
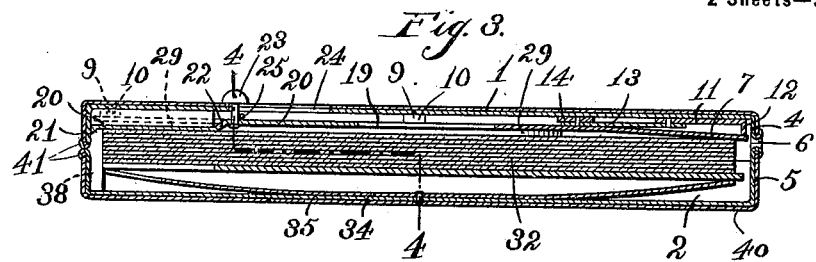
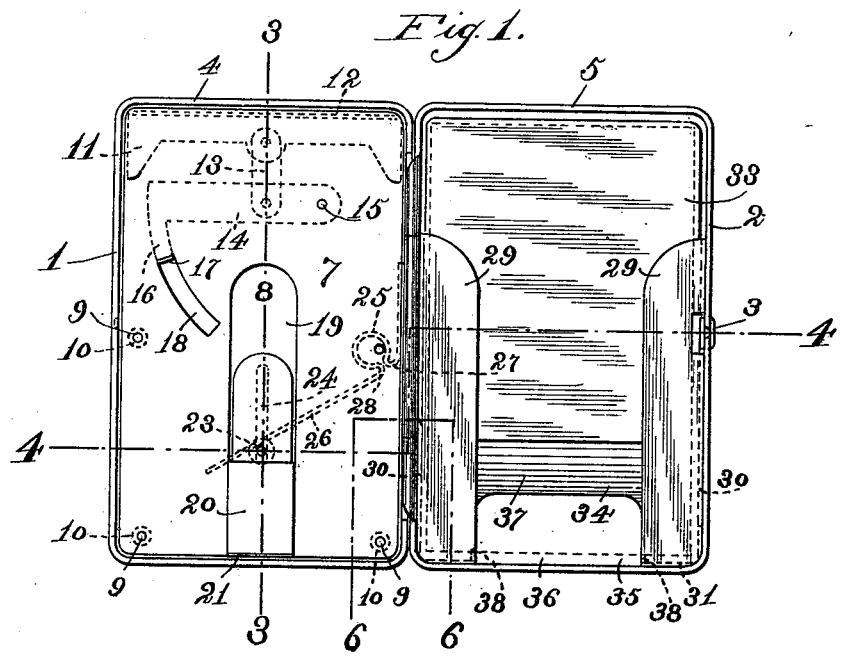
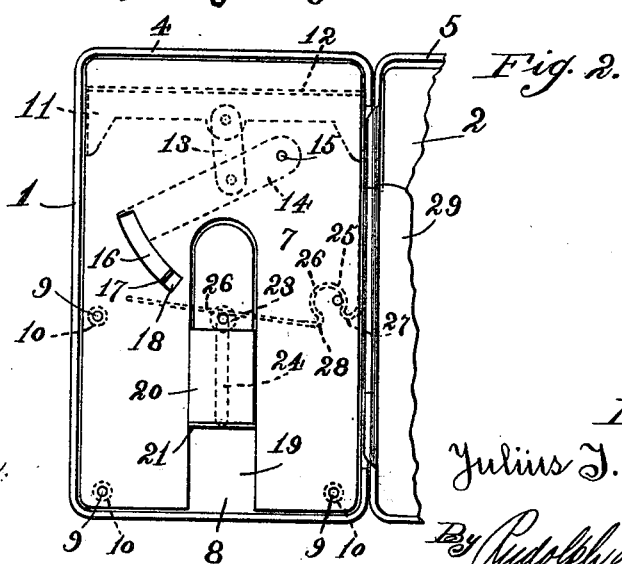
Witnesses:
E. F. Wilson
Theo. Kantny
Inventor:
Julius T. Edson
By Rudolph M. Lotz
Attorney.

No. 665,385. Patented Jan. 1, 1901.
J. T. EDSON.
CARD CASE.
(Application filed Mar. 19, 1900.)
(No Model.) 2 Sheets—Sheet 2.
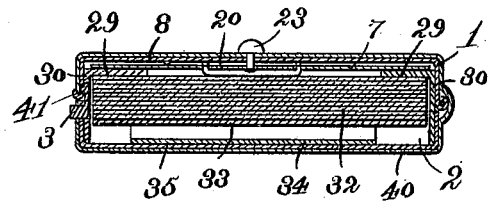
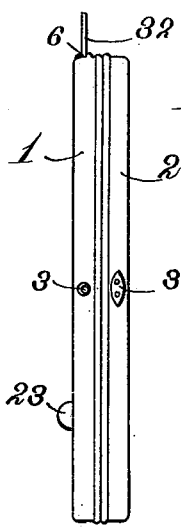
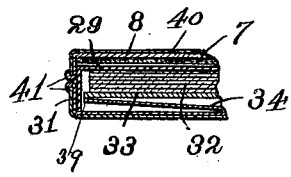
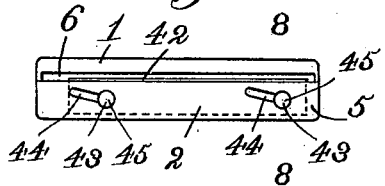
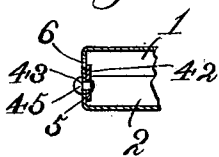
Witnesses:
E. F. Wilson.
Theo. Kantny
Inventor:
Julius T. Edson
By Rudolph Wm. Lotz
Attorney
THE NORRIS PETERS CO., PHOTO-LITHO., WASHINGTON, D. C.

UNITED STATES PATENT OFFICE.

JULIUS T. EDSON, OF RIVERSIDE, ILLINOIS, ASSIGNOR TO EDSON & CO., OF CHICAGO, ILLINOIS.

CARD-CASE.

SPECIFICATION forming part of Letters Patent No. 665,385, dated January 1, 1901.

Application filed March 19, 1900. Serial No. 9,228. (No model.)

*To all whom it may concern:*

Be it known that I, JULIUS T. EDSON, a citizen of the United States, residing at Riverside, in the county of Cook and State of Illinois, have invented certain new and useful Improvements in Pocket Card-Cases; and I do hereby declare the following to be a full, clear, and exact description of the invention, such as will enable others skilled in the art to which it appertains to make and use the same.

My invention relates to a novel construction in a pocket card-case, the object being to provide a neat and compact device which will keep the cards clean, in perfect shape, which will eject them one at a time, and which can be readily regulated to accommodate cards of any thickness; and it consists in the features of construction and combinations of parts hereinafter fully described and claimed.

In the accompanying drawings, illustrating my invention, Figure 1 is a view in elevation of the inside of my card-case when open. Fig. 2 is a similar view, partly broken away and showing the regulator for the delivery-slot and the ejector in different positions than shown in Fig. 1. Fig. 3 is a central longitudinal section, on an enlarged scale, on the line 3 3 of Fig. 1, the case being closed and filled with cards. Fig. 4 is a transverse section on the line 4 4 of Fig. 3 and likewise on the line 4 4 of Fig. 1. Fig. 5 is an end elevation of the case, showing the latch. Fig. 6 is a fragmentary detail section on the line 6 6 of Fig. 1, the case being closed. Fig. 7 is a top plan view of a case provided with a regulator for the delivery-slot of modified construction. Fig. 8 is fragmentary detail sectional view on the line 8 8 of Fig. 7.

My card-case consists of two sections 1 and 2 of practically equal dimensions, which are adapted to be locked together by means of a latch 3 of any suitable construction. The upper end wall 4 of the section 1 is less in width than the other end walls thereof, while the end wall 5 of the section 2 is slightly wider than its other end walls, said end walls 1 and 2 together being of less total width than the combined widths of the remaining walls of both said sections, thereby leaving an open space forming a card-delivery slot 6 when the case is closed. To provide for the passage of single cards of varying thickness through said slot 6, I provide devices for adjusting the width of the latter, said devices comprising a plate 7, secured to the front wall 8 of said section 1 at its middle and lower ends by means of rivets 9, washers 10 around said rivets being interposed between said plate 7 and said wall 8 to leave a free space between the same. The upper end of said plate 7 is thus left free and can be bent inwardly or outwardly at will. Said plate 7 is made of metal having sufficient elasticity or spring to maintain a tendency to remain straight. Between said plate 7 and said wall 8 I interpose a plate 11, provided on its upper edge with a flange 12, against the edge of which said plate 7 bears and which normally holds said plate with its inner upper edge flush with the inner edge of the end wall 4 of said section 1. Said plate 11 is adapted to move longitudinally and acts as a wedge to bend said plate 7 outwardly at its upper end, so as to project more or less beyond the inner edge of said end wall 4 of said section 1, thereby obviously decreasing the width of said slot 6. Said plate 11 is connected by means of a link 13 with a lever 14, fulcrumed at one end upon a rivet 15 in said wall 8 and provided at its other end with a tongue 16, having a flange 17, which passes through a segmental slot 18 in said plate 7, above which it projects slightly. By turning said lever 14 said plate 11 is obviously moved up or down, thus actuating the free end of said plate 7 and adjusting said slot 6 as desired. Said plate 7 is provided at its middle portion with a longitudinal slot or recess 19, extending from a point between its middle and upper end portions to its lower end. In said slot a plate or ejector 20 moves, the latter being provided at its lower end with a narrow flange 21, adapted to engage the lower ends of the cards. About midway between its ends said plate or ejector is offset, as at 22, the part below said offset portion projecting beyond said plate 7 and the part above the same being practically flush with said plate 7. The shank of a button 23 is secured at its inner end to said upper offset portion of said ejector 20 and passes through a slot 24 in said wall 8, said button being adapted to be engaged by the thumb to move said ejector longitudinally. Said ejector 20 is normally held at the lower limit of its movement by means of a spring 25 of peculiar form, which is interposed between said plate 7 and wall 8 and is held in place at one end by means of one of said rivets 9, which it engages, the free end of said spring passing over and engaging the said shank of said button 23. The form of said spring 25 is particularly important as it is the result of long and tedious experiment, it having been found to be no inconsiderable difficulty to find a spring which in the small space provided for it would be sufficiently resilient to do the work without snapping off. The said spring consists, preferably, of a piece of piano-wire bent between its ends to form a large loop or eyelet 26 and two small loops 27 and 28 adjacent same, said loops 27 being of greater diameter than the space between the rivet 9 and the adjacent end wall of the section 1, so that said spring is securely held in place thereby, the said rivet passing through the large loop 26. The ends of said wire are thereby brought to extend at an angle of about one hundred and twenty degrees to each other, one of said ends bearing against the adjacent end wall of said section 1 and the other thereof upon said shank of said button 23. A spring thus formed is particularly elastic, as it gives way at all the loops and at its ends, so that its total length is brought into play. The said section 2 is provided with a raised portion comprising two plates 29, provided on two edges with flanges 30 and 31, fitting against the side and lower walls of said section 2, to which they are suitably secured, said flanges 30 and 31 being of greater width than the depth of said section 2, so that said plates 29 project into the section 1 when said case is closed. Said plates are located at each side of said section 2 and extend from the lower end thereof to a point between the middle and upper ends. The cards 32 are held between said plates 29 and a follower-plate 33 below the same, which is normally held in contact with said plates 29 by means of a curved flat spring 34, riveted at its middle portion to the middle portion of the wall 35 of said section 2 and engaging said plate 33 at its ends. Said spring 34 and follower-plate 33 are recessed or bifurcated at their lower ends, as at 36 and 37, thus leaving an open space between the ejector 20 and the wall 35 of the section 2 when the case is closed. The inner ends of the flanges 31 are bent upwardly at their inner ends to form stops 38, against which the lower ends of the cards bear, so as to leave a free space below the same, into which the flange 21 of said ejector 20 projects slightly when said ejector is at the lower limit of its movement, thus insuring its engagement with the lower edge of the uppermost card. Said follower-plate 33 is provided at its lower edges with small flanges 39, which are adapted to engage the lower end of said spring 34 to lock said plate 33 against ejection with the last card and holding it securely in place at all times.

In covering metallic cases of this kind with leather or similar material the covering 40 always first becomes loosened along the exposed edges of the case and generally becomes rough and loses its neat appearance. To overcome this difficulty, I provide flanges 41 on all of said edges of the casing which are at any time exposed, said flanges being turned over outwardly to form small grooves into which the edges of the covering are inserted, said flanges being then clenched upon said covering. The latter is of course cemented upon the surfaces of the casing. The upturned edges of said flanges are polished and present a beautiful contrast to the dull color of the covering, thus making a very elegant device.

In Figs. 7 and 8 I have shown another but less efficient form of adjusting device for the delivery-slot 6, consisting of a plate 42 of less length and width than the end wall 5 of the section 2, which is movably secured to the inner face of said end wall 5 by means of pins 43, passing through parallel inclined slots 44 in said end wall, said pins 43 being provided with heads 45 of greater diameter than the width of said slots 44. By pushing on one of said pins said plate 42 is moved longitudinally and laterally, thus projecting more or less beyond the edge of the wall 5 and increasing or decreasing the width of said slot 6.

I claim as my invention—

1. In a card-case, the combination with two sections hinged together, devices carried by one section for holding cards, and devices carried by the other section for engaging and ejecting said cards, the said sections being formed to provide a delivery-slot between two of the meeting edges thereof and devices carried by one of said sections whereby the width of said delivery-slot is adjusted.

2. In a card-case, the combination with a case composed of two sections hinged together and adapted to form a delivery-slot between two of their meeting edges, raised flanges in one of said sections, a spring-actuated follower-plate below said flanges between which and said plate cards are adapted to be held, and projections below said flanges forming stops for said cards adjacent the lower end of said section, of a reciprocating ejector carried by the other of said sections and provided at its lower end with a flange adapted to project into the space between said projections in said first-named sections.

3. In a card-case, the combination with a case composed of two sections hinged together and adapted to form a delivery-slot between two of their meeting edges, raised flanges in one of said sections, a spring-actuated follower-plate below said flanges between which and said plate cards are adapted to be held, and projections below said flanges forming stops for said cards adjacent the lower end of said section, of a reciprocating ejector carried by the other of said sections and provided at its lower end with a flange adapted to project into the space between said projections in said first-named sections, and a spring engaging said ejector for holding same normally at the lower limit of its movement.

4. In a card-case of the kind specified, a reciprocating ejector, a button carried thereby, a slot in one wall of said case through which said button projects, and a spring secured to said case at one end and bearing with its free end against the shank of said button for holding said ejector normally at the lower limit of its movement, said spring comprising a wire bent between its ends in opposite directions to form three loops, the straight ends extending at an obtuse angle to each other and bearing respectively against said shank of said button and against one of the walls of said case.

5. A card-case comprising two separable members and provided with a delivery-slot, devices for ejecting cards therethrough and devices for adjusting the width of said slot, comprising a plate secured at its lower and middle portions to one of said members and having a free upper end, a wedge interposed between said free end of said plate and said member to which it is secured, and means for moving said wedge to bend said free end of said plate, the latter being adapted to project beyond one edge of said delivery-slot to partially close the same.

6. A card-case comprising two separable members and provided with a delivery-slot, devices for adjusting the width of same comprising a spring-plate secured at its lower and middle portions to one of said members and having a free upper end, washers interposed between said plate and said member for providing a free space between the same, a wedge movably mounted between said free end of said plate and said wall, a lever pivotally mounted in said space, a link connecting said lever with said wedge, and a slot in said spring-plate through which the end of said lever projects, said free end of said plate being adapted to project beyond one wall of said slot to partially close the latter.

7. A card-case comprising two separable members and provided with a delivery-slot, devices for adjusting the width of same comprising a spring-plate secured at its lower and middle portions to one of said members and having a free upper end, washers interposed between said plate and said member for providing a free space between the same, a wedge movably mounted between said free end of said plate and said wall, devices for moving said wedge to bend said plate, a slot in said plate, an ejector movable in said slot, a button carried by said ejector, and a slot in said wall through which said button passes.

8. A card-case comprising two separable members and provided with a delivery-slot, devices for adjusting the width of same comprising a spring-plate secured at its lower and middle portions to one of said members and having a free upper end, washers interposed between said plate and said member for providing a free space between the same, a wedge movably mounted between said free end of said plate and said wall, devices for moving said wedge to bend said plate, a slot in said plate, an ejector movable in said slot, a button carried by said ejector, a slot in said wall through which said button passes, and a spring fulcrumed in said space between said plate and said wall and bearing at one end upon the shank of said button for holding said ejector normally at the lower limit of its movement.

9. In a card-case, the combination with two separable members, an ejector carried by one of said members, said members being adapted to form a delivery-slot between two of their meeting edges, of raised flanges in the other of said members, a follower-plate behind said flanges adapted to hold said cards against the inner faces of the latter, a curved flat spring interposed behind said follower-plate and bearing at its ends against the end portions of the latter, and flanges at one end of said follower-plate adapted to engage one end of said spring for holding said follower-plate against withdrawal from said case.

10. In a card-case of the kind specified, the combination with the case composed of two sections hinged together, of raised flanges in one of said sections, a curved flat spring secured at its middle portion to the wall underneath said flanges, a follower-plate interposed between said spring and said flanges and resting at its ends upon the ends of said spring, flanges at one end of said plate adapted to engage one end of said spring, said sections being adapted to form a slot between two of their meeting edges, and an ejector carried by the other of said sections.

11. In a card-case of the kind specified, the combination with the case provided with a delivery-slot, and an ejector, of a follower-plate adapted to bring the cards into alinement with said delivery-slot, said plate being bifurcated at its lower end to allow said ejector free movement relatively thereto when the cards are exhausted, flanges on said bifurcated end of said follower-plate, and a curved flat spring interposed between said follower-plate and the adjacent wall of said casing and bearing at its ends against said plate, said spring being bifurcated at its lower end and to engage said flanges to hold said plate against removal.

In testimony whereof I affix my signature in presence of two witnesses.

JULIUS T. EDSON.

Witnesses:
WM. B. SNOWHOOK,
RUDOLPH WM. LOTZ.